US011443229B2

(12) United States Patent
Ring et al.

(10) Patent No.: US 11,443,229 B2
(45) Date of Patent: Sep. 13, 2022

(54) METHOD AND SYSTEM FOR CONTINUAL LEARNING IN AN INTELLIGENT ARTIFICIAL AGENT

(71) Applicants: Sony Corporation, Tokyo (JP); Sony Corporation of America, New York, NY (US)

(72) Inventors: Mark Bishop Ring, Anaheim, CA (US); Satinder Baveja, Ann Arbor, MI (US); Roberto Capobianco, Itri (IT); Varun Kompella, Aachen (DE); Kaushik Subramanian, Richmond, CA (US); James MacGlashan, Riverside, RI (US)

(73) Assignees: Sony Group Corporation, Tokyo (JP); Sony Corporation of America, New York, NY (US)

( * ) Notice: Subject to any disclaimer, the term of this patent is extended or adjusted under 35 U.S.C. 154(b) by 727 days.

(21) Appl. No.: 16/120,111

(22) Filed: Aug. 31, 2018

(65) Prior Publication Data

US 2020/0074349 A1    Mar. 5, 2020

(51) Int. Cl.
 *G06N 3/08* (2006.01)
 *G06N 5/04* (2006.01)
 *G06N 20/00* (2019.01)

(52) U.S. Cl.
 CPC ............. *G06N 20/00* (2019.01); *G06N 3/088* (2013.01); *G06N 5/043* (2013.01)

(58) Field of Classification Search
 CPC .................................. G06N 3/08; G06N 3/088
 See application file for complete search history.

(56) References Cited

U.S. PATENT DOCUMENTS

| 6,594,524 | B2 | 7/2003 | Esteller et al. |
| 9,997,039 | B1 | 6/2018 | Heaton et al. |
| 10,289,910 | B1 | 5/2019 | Chen et al. |
| 2008/0059274 | A1 | 3/2008 | Holliday |
| 2014/0095412 | A1 | 4/2014 | Agashe et al. |
| 2015/0290798 | A1 | 10/2015 | Iwatake |

(Continued)

OTHER PUBLICATIONS

Vecerik, Mel, et al. "Leveraging demonstrations for deep reinforcement learning on robotics problems with sparse rewards." arXiv preprint arXiv:1707.08817v1 (2017). (Year: 2017).*

(Continued)

*Primary Examiner* — Hal Schnee
(74) *Attorney, Agent, or Firm* — Innovation Capital Law Group, LLP; Vic Lin

(57) ABSTRACT

A method and system for teaching an artificial intelligent agent includes giving the agent several examples where it can learn to identify what is important about these example states. Once the agent has the ability to recognize a goal configuration, it can use that information to then learn how to achieve the goal states on its own. An agent may be provided with positive and negative examples to demonstrate a goal configuration. Once the agent has learned certain goal configurations, the agent can learn an option to achieve the goal configuration and a distance function that predicts at least one of a distance and a duration to the goal configuration under the learned option. This distance function prediction may be incorporated as a state feature of the agent.

17 Claims, 3 Drawing Sheets

(56) References Cited

U.S. PATENT DOCUMENTS

| | | | |
|---|---|---|---|
| 2019/0012371 A1 | 1/2019 | Campbell et al. | |
| 2019/0130312 A1* | 5/2019 | Xiong | G06F 9/4881 |
| 2019/0261566 A1* | 8/2019 | Robertson | A01D 46/243 |
| 2019/0347621 A1* | 11/2019 | White | G06N 3/08 |
| 2020/0090042 A1* | 3/2020 | Wayne | G06N 3/0445 |
| 2020/0211106 A1 | 7/2020 | Pan et al. | |
| 2021/0187733 A1* | 6/2021 | Lee | B25J 9/1656 |

OTHER PUBLICATIONS

Florensa, Carlos, et al. "Reverse curriculum generation for reinforcement learning." Conference on robot learning. PMLR, 2017. (Year: 2017).*

Botvinick, Matthew Michael. "Hierarchical reinforcement learning and decision making." Current opinion in neurobiology 22.6 (2012): 956-962. (Year: 2012).*

Anna Gruebler, Coaching robot behavior using continuous physiological affective feedback, 2011 11th IEEE-RAS International Conference on Humanoid Robots, Bled, Slovenia, Oct. 26-28, 2011 (Year: 2011).

Begleiter et. al., "On Prediction Using Variable Order Markov Models", 2004, Journal of Artificial Intelligence Research, 22 (2004), pp. 385-421 (Year: 2004).

Jens Kober, Reinforcement learning in robotics: A survey, The International Journal of Robotics Research, 32(11) 1238-1274, 2013 (Year: 2013).

Masakazu Hirkoawa, Coaching Robots: Online Behavior Learning from Human Subjective Feedback, I. Jordanov and L.C. Jain (Eds.): Innovations in Intelligent Machines-3, SCI 442, pp. 37-51. (Year: 2013).

Patrick Gruneberg, An Approach to Subjective Computing: A Robot That Learns From Interaction With Humans, IEEE Transactions on Autonomous Mental Development, vol. 6, No. 1, Mar. 2014 (Year: 2014).

Thorhallsson et. al., Visualizing the Bias Variance Tradeoff, 2017, University of British Columbia, 2017, pp. 1-9 (Year: 2017).

Wang et. al., "genCNN: A Convolutional Architecture for Word Sequence Prediction", 2015, arXiv, 2015, pp. 1-13 (Year: 2015).

Wu et. al., "A Novel Sensory Mapping Design for Bipedal Walking on a Sloped Surface", 2012, International Journal of Advanced Robotic Systems, 9 (2012), pp. 1-9 (Year: 2012).

Willems, et al., "The Context-Tree Weighting Method: Basic Properties", IEEE Transactions on Information Theory, vol. 41, No. 3, May 1995, pp. 653-664.

Grollman ("Robot Learning from Failed Demonstrations") Int J Soc Robot (2012) 4:331-342, Jun. 30, 2012 © Springer Science & Business Media BV 2012 (Year: 2012).

Katyal ("Leveraging Deep Reinforcement Learning for Reaching Robotic Tasks") Proceedings of the IEEE Conference on Computer Vision and Pattern Recognition (CVPR) Workshops, 2017, pp. 18-19 (Year: 2017).

Nicolescu ("Natural Methods for Robot Task Learning: Instructive Demonstrations, Generalization and Practice") AAMAS'03, Jul. 14-18, 2003, Melbourne, Australia. (Year: 2003).

Zhong et. al., "Toward a self-organizing pre-symbolic neural model representing sensorimotor primitives", 2014, Frontiers in Behavioral Neuroscience, vol. 8, pp. 1-11 (Year: 2014).

Bellemare et. al., "Skip Context Tree Switching", 2014, Proceedings of the 31st International Conference on Machine Learning, vol. 32(2), pp. 1458-1466 (Year: 2014).

Baranes_2012_Active learning of inverse models with intrinsically motivated goal exploration in robots Robotics and Autonomous Systems 61 (2013) 49-73 (Year: 2012).

Brandes et al., "ASAP: A Machine Learning Framework for Local Protein Properties", 2016, Database, vol. 2016, pp. 1-10 (Year: 2016).

Thomaz_2008_ Teachable robots: Understanding human teaching behavior to build more effective robot learners Artificial Intelligence 172 (2008) 716-737 (Year: 2008).

Tjalkens et al., "Context Tree Weighting: Multi-Alphabet Sources", 1993, Proceedings of the 14th Symposium on Information Theory in the Benelux, vol. 14(1993), pp. 128-135 (Year: 1993).

Zaheer et al., "Latent LSTM Allocation: Joint Clustering and Non-Linear Dynamic Modeling of Sequence Data", 2017, Proceedings of the 34th International Conference on Machine Learning, vol. 34 (2017), pp. 3967-3976 (Year: 2017).

* cited by examiner

METHOD AND SYSTEM FOR CONTINUAL LEARNING IN AN INTELLIGENT ARTIFICIAL AGENT

BACKGROUND OF THE INVENTION

1. Field of the Invention

One or more embodiments of the invention relates generally to intelligent artificial agents. More particularly, the invention relates to teaching an intelligent artificial agent through continual learning.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Currently known systems for training artificial agents exhibit a variety of issues. In many cases, the user lacks the ability to control the skills and knowledge that are learned by the agent, or such learned skills and knowledge may be items that the user does not find to be as important as other desired skills and knowledge. Moreover, conventional systems may lack the ability to layer the skills and knowledge in a modular fashion to be used in learning higher level skills and knowledge. Also, in conventional systems, the artificial agent may not learn a specific form of knowledge, a prediction of features of experience during execution of a skill.

In view of the foregoing, there is need for improvements in the training of skills and knowledge and layering of skills and knowledge in artificial intelligent agents.

SUMMARY OF THE INVENTION

Embodiments of the present invention provide a method for training an artificial intelligent agent comprising defining a first continual learning block to include a first skill to achieve a first goal configuration for the agent and a first knowledge function providing a first prediction of at least one of a distance and a duration to achieve the first goal configuration using the skill to achieve the first goal configuration as well as a first prediction of any vector-valued function of the interaction history when using the skill to achieve the goal configuration.

Embodiments of the present invention further provide a method of learning to achieve a goal configuration of an artificial agent comprising defining the goal configuration for the agent as part of a continual learning block; and relying on a previous learned continual learning block to achieve the goal configuration.

Embodiments of the present invention also provide a method of learning to achieve a goal configuration of an artificial agent comprising defining the goal configuration for the agent as part of a continual learning block; determining a knowledge feature as a prediction of at least one of a duration and a distance required to achieve the goal configuration, the knowledge feature being a component of the continual learning block; and relying on a previous learned goal configuration to achieve the goal configuration.

In some embodiments, a previous knowledge feature is used to achieve the goal configuration, the previous knowledge feature being a previous prediction of at least one of a duration and a distance required to achieve the previous learned goal configuration, the previous knowledge feature, along with the previous goal configuration, being a component of a previous continual learning bock.

In some embodiments, the previous continual learning block includes a plurality of previous continual learning blocks, each having a respective previous learned goal configuration and a respective previous knowledge feature.

In some embodiments, the plurality of each of the previous continual learning blocks are relied upon to achieve the goal configuration.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
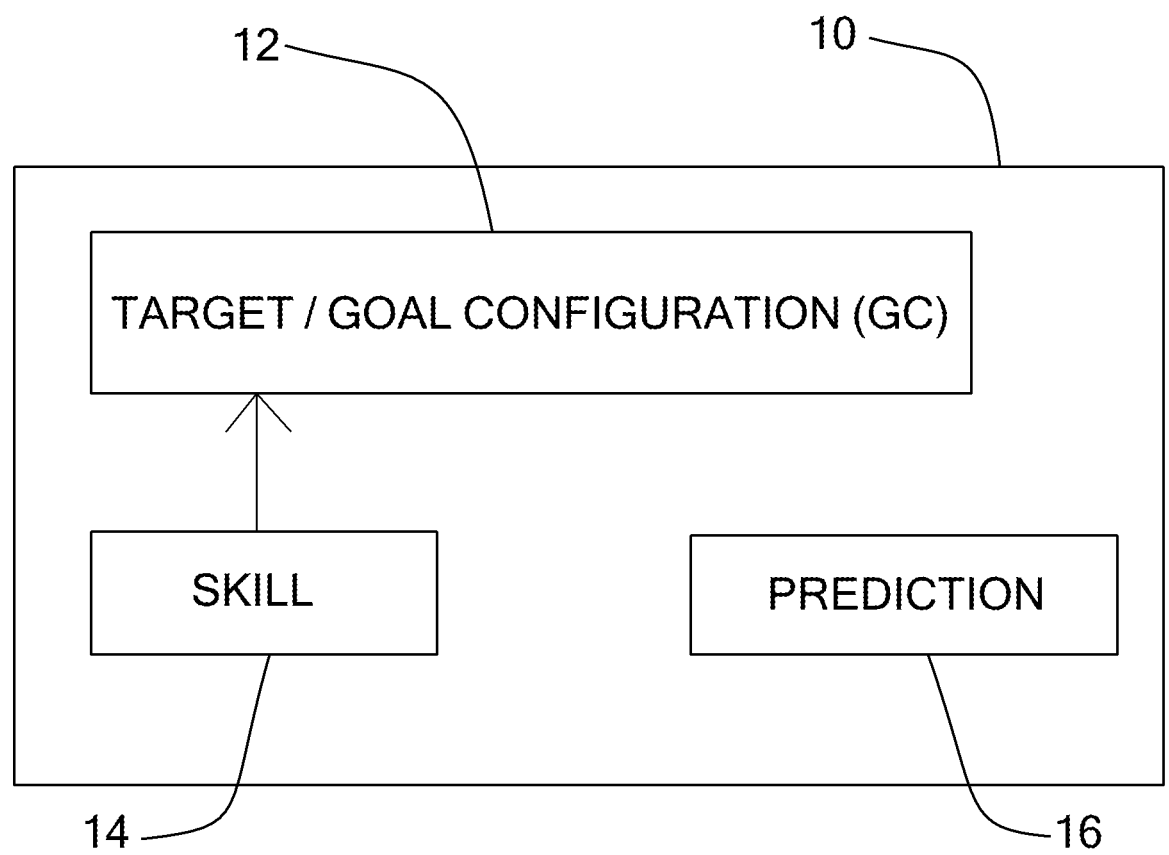
FIG. 1 illustrates a block diagram of an exemplary continual learning block according to the present invention.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field programmable gate array (FPGA), an application specific integrated circuit (ASIC), an application specific instruction-set processor (ASIP), a chip, chips, a system on a chip, or a chip set; a graphics processing unit (GPU); a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, handheld devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Python, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code may also be distributed among a plurality of computational units wherein each unit processes a portion of the total computation.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random-access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, an EEPROM or any other memory chip or cartridge, a carrier wave as described hereinafter, or any other medium from which a computer can read.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CDROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer readable media.

While a non-transitory computer-readable medium includes, but is not limited to, a hard drive, compact disc, flash memory, volatile memory, random access memory, magnetic memory, optical memory, semiconductor-based memory, phase change memory, optical memory, periodically refreshed memory, and the like; the non-transitory computer readable medium, however, does not include a pure transitory signal per se; i.e., where the medium itself is transitory.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory or may be communicated to an external device so as to cause physical changes or actuation of the external device. A "computing platform" may comprise one or more processors.

The term "robot" or "agent" or "intelligent agent" or "artificial agent" or "artificial intelligent agent" may refer to any system controlled directly or indirectly by a computer or computing system that issues actions or commands in response to senses or observations. The term may refer without limitation to a traditional physical robot with physical sensors such as cameras, touch sensors, range sensors, and the like, or to a simulated robot that exists in a virtual simulation, or to a "bot" such as a mailbot or searchbot that exists as software in a network. It may without limitation refer to any limbed robots, walking robots, industrial robots (including but not limited to robots used for automation of assembly, painting, repair, maintenance, etc.), wheeled robots, vacuum-cleaning or lawn-mowing robots, personal assistant robots, service robots, medical or surgical robots, flying robots, driving robots, aircraft or spacecraft robots, or any other robots, vehicular or otherwise, real or simulated, operating under substantially autonomous control, including also stationary robots such as intelligent household or workplace appliances.

Many practical embodiments of the present invention provide means and methods for efficient performance of activities by an artificial intelligent agent.

In some embodiments, a "sensor" may include, without limitation, any source of information about an agent's environment, and, more particularly, how a control may be directed toward reaching an end. In a non-limiting example, sensory information may come from any source, including, without limitation, sensory devices, such as cameras, touch sensors, range sensors, temperature sensors, wavelength sensors, sound or speech sensors, proprioceptive sensors, position sensors, pressure or force sensors, velocity or acceleration or other motion sensors, etc., or from compiled, abstract, or situational information (e.g. known position of an object in a space) which may be compiled from a collection of sensory devices combined with previously held information (e.g. regarding recent positions of an object), location information, location sensors, and the like.

The terms "observation" or "observations" refers to any information the agent receives by any means about the agent's environment or itself. In some embodiments, that information may be sensory information or signals received through sensory devices, such as without limitation cameras, touch sensors, range sensors, temperature sensors, wavelength sensors, sound or speech sensors, position sensors, pressure or force sensors, velocity or acceleration or other motion sensors, location sensors (e.g., GPS), etc. In other embodiments that information could also include without limitation compiled, abstract, or situational information compiled from a collection of sensory devices combined with stored information. In a non-limiting example, the agent may receive as observation abstract information regarding the location or characteristics of itself or other objects. In some embodiments this information may refer to people or customers, or to their characteristics, such as purchasing habits, personal contact information, personal preferences, etc. In some embodiments, observations may be information about internal parts of the agent, such as without limitation proprioceptive information or other information regarding the agent's current or past actions, information about the agent's internal state, or information already computed or processed by the agent.

The term "action" refers to the agent's any means for controlling, affecting, or influencing the agent's environment, the agent's physical or simulated self or the agent's internal functioning which may eventually control or influence the agent's future actions, action selections, or action preferences. In many embodiments the actions may directly control a physical or simulated servo or actuator. In some embodiments the actions may be the expression of a preference or set of preferences meant ultimately to influence the agent's choices. In some embodiments, information about the agent's action(s) may include, without limitation, a probability distribution over the agent's action(s), and/or outgoing information meant to influence the agent's ultimate choice of action.

The term "state" or "state information" refers to any collection of information regarding the state of the environment or agent, which may include, without limitation, information about the agent's current and/or past observations.

The term "policy" refers to any function or mapping from any full or partial state information to any action information. Policies may be hard coded or may be modified, adapted or trained with any appropriate learning or teaching method, including, without limitation, any reinforcement-learning method or control optimization method. A policy may be an explicit mapping or may be an implicit mapping, such as without limitation one that may result from optimizing a particular measure, value, or function. A policy may include associated additional information, features, or characteristics, such as, without limitation, starting conditions (or probabilities) that reflect under what conditions the policy may begin or continue, termination conditions (or probabilities) reflecting under what conditions the policy may terminate.

The term "distance" refers to any monotonic function. In some embodiments, distance may refer to the space between two points on a surface as determined by a convenient metric, such as, without limitation, Euclidean distance or Hamming distance. Two points or coordinates are "close" or "nearby" when the distance between them is small.

Broadly, embodiments of the present invention provide methods and systems for teaching an artificial intelligent agent where the agent can be placed in a state that it would like it to learn how to achieve. By giving the agent several examples, it can learn to identify what is important about these example states. Once the agent has the ability to recognize a goal configuration, it can use that information to then learn how to achieve the goal states on its own. An agent may be provided with positive and negative examples to demonstrate a goal configuration. Once the agent has learned certain goal configurations, the agent can learn an option to achieve the goal configuration and a knowledge feature that predicts at least one of a distance and a duration to the goal configuration under the learned option. This knowledge feature prediction may be incorporated as a state feature of the agent.

At the outset, the agent needs to learn how to achieve goal configurations. This method, as described in U.S. patent application Ser. No. 15/943,947, herein incorporated by reference, can include identifying positive examples and identifying negative examples so that the agent can extract relevant state features.

For example, the agent may be an intelligent robot pet where a user desires to train the robot pet to position itself near a red ball. The agent can be positioned near the red ball (for example, within one body length from the red ball) and the user can indicate this as a positive example. The agent can be allowed to walk away from the red ball and the user can indicate this as a negative example. Similarly, when the agent is near a yellow ball, the user can indicate this as a negative example. This training can continue until the agent can achieve the goal configuration and can act accordingly when provided the command to be near the red ball.

The positive and negative examples may be provided by various types of interfaces. Such interfaces can include a spoken word by the user identified by the agent via, for example, a microphone. Other interfaces can include mobile device interfaces, such as a wireless connection between the mobile device and the agent, where feedback can be provided to the agent via the mobile device; a positive/negative example button on the device itself; hand gestures; or the like.

As shown in FIG. 1, a continual learning (CL) block 10 can include both a skill and a piece of knowledge that can be used as a building block upon which additional CL blocks can rest. Each CL block 10 is defined by a target or goal configuration 12, which the agent learns a skill 14 to achieve, and a prediction 16, which can be used in the target definition for other CL blocks. Creating such a mechanism may allow a user to build up skills and knowledge incrementally by specifying goal configurations that supply useful skills or knowledge that can then be incorporated into later CL blocks.

Each CL block 10 can be built from four components. The first component is a component to learn a robust goal configuration, based on state information. The source of the goal configuration snapshots can be human or self-generated. The second component is a component to learn an option to achieve the goal configuration. The third component is a component to learn a knowledge feature for predicting a number of steps to a goal configuration under the option learned in the second component. The number of steps to a goal configuration may be a distance, a duration or both, for example. In some embodiments, the knowledge feature may be a distance function. This distance function could be a value function based on the goal configuration being a termination condition, for example. In other embodiments, the knowledge feature may be other functions, such as a time to completion, a time to initiation of something else, a prediction of a value of a feature at the time of completion, or the like.

The fourth component is a component that may incorporate the prediction from the third component as a state feature. In some embodiments, rather than incorporating the prediction explicitly as a new state feature, the component may verify that this value is computable from the current features.

The CL block 10 may allow for incremental training of skills and knowledge that the user or owner finds to be important. Additionally, the skills and predictions developed as described above can be used for modular layering of the CL blocks.

Figure 2:
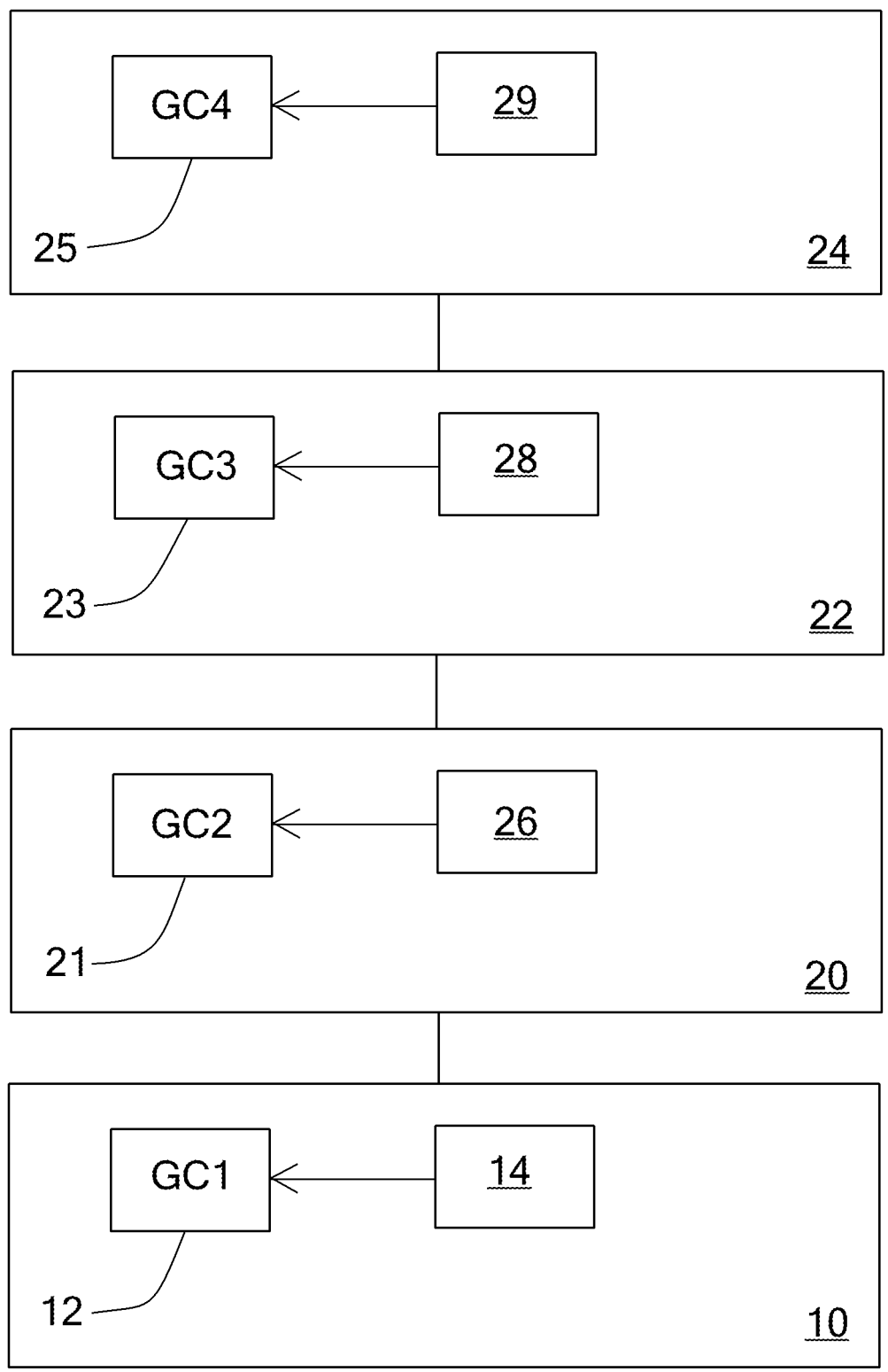
FIG. 2 illustrates a relationship between multiple ones of the continual learning blocks of FIG. 1.

As shown in FIG. 2, the CL block 10 may be used in future CL blocks 20, 22, 24. For example, as shown in FIG. 2, CL block 24 may be a combination of CL blocks 10, 20 and 22. The agent may understand to position itself in a state where goal configurations 12, 21 and 23 are true, as such a configuration is required to achieve goal configuration 25 of CL block 24. These goal configurations 12, 21, 23 may depend on each other in some way. The agent may execute skills 14, 26, 28 and 29 to get goal configurations 12, 21, 23 and 25 true at the same time. This may make goal configuration 25 true or at least place the agent in a state to perform an action to make goal configuration 25 true.

One example where two CL blocks are used is described below. Here, the knowledge that a ball is captured under the chin of a robotic dog may be obtained by two CL blocks being true. A first CL block, entitled, for example, "looking down at ball" may have the goal configuration (GC1) of standing while looking down at the ball. The robot can learn a policy to reach this goal configuration (GC1) from all nearby states or positions, including the position where the ball is captured under its chin. The prediction (distance function) of the first CL block may describe the number of steps or actions needed to reach GC1 from the robot's current position. A second CL block, entitled, for example, "ball captured" may have the goal configuration (GC2) of lying down with ball under chin. As can be seen, the first CL block forecast will have a high value here, which should be included as part of GC2. The robot can learn policies to reach GC2 from all nearby positions. The unique features of GC2 are that the robot is lying down, does not see the ball, and GC1 has a high value. In other words, once GC1 is true (standing while looking down at the ball), the robot may lie down with the ball under its chin in a single step to satisfy GC2. Future CL blocks can incorporate both the first and second CL blocks. For example, teaching the robot to fetch may require satisfaction of GC1 and GC 2, wherein the unique feature of this new, fetch CL block may include capturing ball between chin and body and returning to the user.

By using the distance function, the agent is provided the ability to plan and "think ahead" and look to see what behaviors are associated with certain predictions. For example, when trying to teach an agent to fetch, an initial state would be having the ball at the agent's feet. If the agent is at one location and the ball is at another location, the agent can look ahead and know that if it moves to the ball, it will be ready for fetching if the user so commands. In some embodiments, the agent may practice a skill, such as fetch, without user intervention. If the skill that the agent wants to practice has a required initial state, the agent can look over skills that are known, such as those in other CL blocks, to help it get into the desired initial state.

As a further example, if an agent desires, or a user desires that the agent practice shooting a soccer ball into a goal, multiple CL blocks may be used to complete the task. The agent may already know how to pick up a ball and how to walk a ball to a certain position. The agent may use the distance function to predict that placing the ball a certain number of feet from the goal can achieve the goal configuration of practicing kicking a ball into a goal. By thinking ahead, the agent can now put itself into a position to repeat practicing kicking the ball into the goal.

In some embodiments, if a goal configuration depends from multiple previous learned goal configurations in other CL blocks, the agent may be able to use the distance function to plan ahead to determine how to best achieve the previous goal configurations, using their dependencies as part of the planning process. While, in some embodiments, it may be most efficient to satisfy a first goal configuration, then a second goal configuration to ultimate satisfy a third goal configuration, with the ability to plan ahead and use the distance functions for each of the CL blocks, the agent may be able to use the dependencies of the first and second goal configurations to find a more efficient way to achieve the third goal configuration instead of their linear achievement. Such an ability to plan ahead may prove more and more useful as the CL blocks depend upon a plurality of other CL blocks being true.

Figure 3:
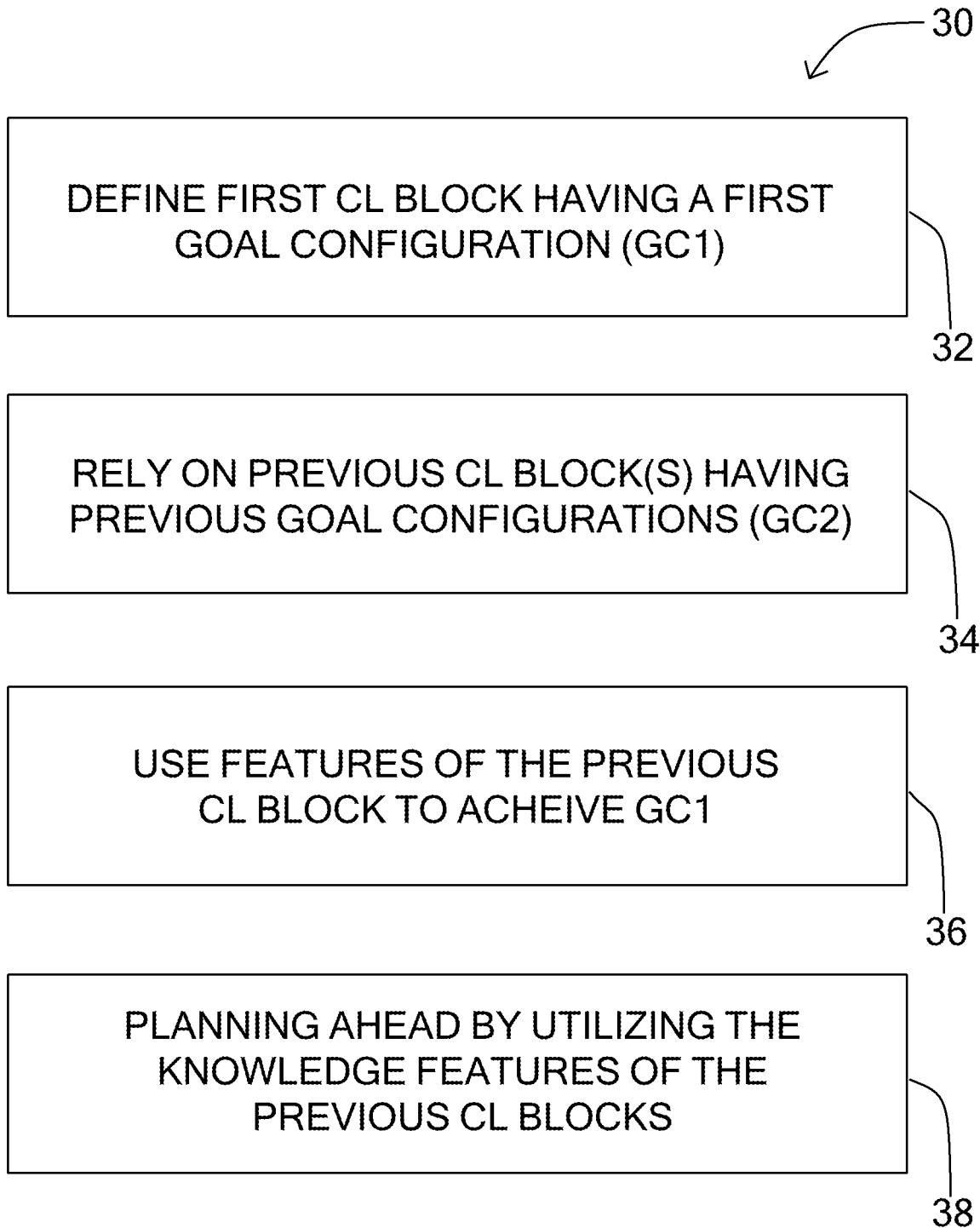
FIG. 3 illustrates a method according to an exemplary embodiment of the present invention.

Referring to FIG. 3, an exemplary method 30 is shown. In this method, a first step 32 defines a first continual learning (CL) block having a first goal configuration (GC1). The first goal configuration may be the goal the agent wishes to achieve. In step 34, the agent relies on a previous continual learning block, having a previous goal configuration, such as GC2, that the agent has previously learned. The previous continual learning block may include a knowledge feature, such as a distance function, predicting the number of steps the agent needs to employ to achieve GC2. The number of steps may include at least one of a distance and a duration. In step 36, features of the previous CL block may be used to achieve the first goal configuration. Depending on the complexity of the first CL block, further previous CL blocks may be relied on for achieving GC1. In step 38, the agent may plan ahead by using the distance functions of each of the previous CL blocks. This may allow the agent to reach GC1 in the most efficient manner.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

The particular implementation of the intelligent artificial agents may vary depending upon the particular context or application. By way of example, and not limitation, the intelligent artificial agents described in the foregoing were principally directed to two-dimensional implementations; however, similar techniques may instead be applied to higher-dimension implementation, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

The claims are thus to be understood to include what is specifically illustrated and described above, what is conceptually equivalent, what can be obviously substituted and also what incorporates the essential idea of the invention.

What is claimed is:

1. A method for training an artificial intelligent agent, comprising: defining, within the agent, a first continual learning block to include a first skill to achieve a first goal configuration for the agent and a first knowledge feature providing a first prediction of at least one of a distance and duration to achieve the first goal configuration;
   using the first skill to move the agent in the first goal configuration;
   defining, within the agent, a second continual learning block, including a second goal configuration, distinct from the first goal configuration, and a second knowledge feature providing a second prediction of at least one of a distance and duration to achieve the second goal configuration, wherein the second continual learning block builds upon the first continual learning block, and
   using the first prediction by the second continual learning block to move the agent to the second goal configuration.

2. The method of claim 1, further comprising:
   using features of the first goal configuration for achievement of the second goal configuration.

3. The method of claim 1, wherein the first knowledge feature is a value function based on the first goal configuration as a termination condition.

4. The method of claim 1, further comprising:
   providing positive examples via an interface to the agent when the agent is in the first goal configuration;
   providing negative examples via the interface to the agent when the agent is not in the first goal configuration; and
   extracting key state features to determine what features are important during receipt of positive examples to the agent.

5. The method of claim 1, further comprising incorporating the first prediction as a state feature of the agent.

6. The method of claim 1, wherein the first knowledge feature is selected from the group consisting of a distance function, a time to completion, a time to initiation of something else, and a prediction of a value of a feature at the time of completion.

7. The method of claim 1, wherein the first knowledge feature is learned, either before, in conjunction with, interleaved with, or after a policy.

8. A method of learning to achieve a goal configuration of an artificial agent, comprising:
   defining, within the agent, the goal configuration for the agent as part of a continual learning block;
   determining a knowledge feature as a prediction of at least one of a distance and duration required to achieve the goal configuration;
   relying on a previous learned continual learning block, having a previously learned distinct goal configuration, to move the agent in the goal configuration;
   determining a first knowledge feature as a first prediction of a number of steps required to achieve the goal configuration; and
   relying on a previous knowledge feature to achieve the goal configuration, the previous knowledge feature being a previous prediction of at least one of a distance and duration required to achieve the previous learned goal configuration.

9. The method of claim 8, wherein a previous knowledge feature is used to achieve the goal configuration, the previous knowledge feature being a previous prediction of at least one of a distance and duration required to achieve the previous learned goal configuration.

10. The method of claim 8, wherein the previous learned goal configuration is an element of a previous continual learning block.

11. The method of claim 10, wherein the previous continual learning block includes a plurality of previous continual learning blocks, each having a respective previous learned goal configuration and a respective previous knowledge feature.

12. The method of claim 11, further comprising planning ahead, by the agent, to determine how to most efficiently achieve the respective previous learned goal configurations in order to achieve the goal configuration.

13. The method of claim 8, wherein the first knowledge feature is selected from the group consisting of a distance function, a time to completion, a time to initiation of something else, and a prediction of a value of a feature at the time of completion.

14. A method of learning to achieve a goal configuration of an artificial agent, comprising:
   defining, within the agent, the goal configuration for the agent as part of a continual learning block;
   determining, within the agent, a knowledge feature as a prediction of at least one of a duration and a distance required to achieve the goal configuration, the knowledge feature being a component of the continual learning block; and
   relying, by the agent, on a previous learned distinct goal configuration, of a previously learned continual learning block, to move the agent in the goal configuration;
   wherein a previous knowledge feature is used to achieve the goal configuration, wherein the previous knowledge feature is a previous prediction of at least one of a duration and a distance required to achieve the previous learned goal configuration, and wherein the previous knowledge feature, along with the previous goal configuration, are components of a previous continual learning block.

15. The method of claim 14, wherein the previous continual learning block includes a plurality of previous continual learning blocks, each having a respective previous learned goal configuration and a respective previous knowledge feature.

16. The method of claim 15, wherein each of the plurality of the previous continual learning blocks are relied upon to achieve the goal configuration.

17. The method of claim 16, further comprising planning ahead, by the agent, to determine how to most efficiently achieve the respective previous learned goal configurations in order to achieve the goal configuration.

* * * * *